US008090018B2

(12) United States Patent
Hsieh et al.

(10) Patent No.: US 8,090,018 B2
(45) Date of Patent: Jan. 3, 2012

(54) IMAGE PROCESSING APPARATUS AND METHOD OF THE SAME

(75) Inventors: Tung-Lin Hsieh, Chung Li (TW); Yu-Wen Huang, Sanchong (TW); Ming-Horng Shiu, Tongsiao Township, Miaoli County (TW); Hsin-Hung Lee, Fongshan (TW)

(73) Assignee: Quanta Computer Inc., Kuei Shan Hsiang, Tao Yuan Shien (TW)

( * ) Notice: Subject to any disclaimer, the term of this patent is extended or adjusted under 35 U.S.C. 154(b) by 1335 days.

(21) Appl. No.: 11/716,112

(22) Filed: Mar. 8, 2007

(65) Prior Publication Data

US 2007/0253634 A1   Nov. 1, 2007

(30) Foreign Application Priority Data

Apr. 26, 2006   (TW) .............................. 95114805 A

(51) Int. Cl.
*H04N 11/02* (2006.01)
(52) U.S. Cl. ......... 375/240.08; 375/240.01; 375/240.09; 382/257; 382/266; 348/683
(58) Field of Classification Search ............. 375/240.01, 375/240.08, 240.09; 382/257, 266; 348/683
See application file for complete search history.

(56) References Cited

U.S. PATENT DOCUMENTS

2006/0067583 A1* 3/2006 Mushano ...................... 382/239

FOREIGN PATENT DOCUMENTS

JP   2000-40154   7/1998

OTHER PUBLICATIONS

Translation of Japan 2000-40154 published on Feb. 8, 2000.*
Peters, II, Richard Alan, "A New Algorithm for Image Noise Reduction Using Mathematical Morphology", IEEE Transactions on Image Processing, vol. 4, No. 5, May 1995, pp. 554-568.
Yu, Zi-yi, et al., "Analysis of Mathematical Morphological Algorithm for Edge Detection in Micrograph", Computer Technology and Development, vol. 16, No. 2, Feb. 2006, pp. 100-102.

* cited by examiner

*Primary Examiner* — Edward Zee
*Assistant Examiner* — Baotran N To
(74) *Attorney, Agent, or Firm* — Thomas|Kayden

(57) ABSTRACT

The invention discloses an image processing apparatus for improving the definition of an input image. The input image consists of a plurality of pixels, and the pixels are divided into an edge portion and a background portion. The image processing apparatus includes a compound operating unit, a sharpness processing unit, and an edge detecting unit. The compound operating unit is used for generating a noise-eliminated image by subjecting the input image to an open-close process and a close-open process. The sharpness processing unit is used for generating an enhanced image by subjecting the input image to a sharpness process. The edge detecting unit is used for receiving the noise-eliminated image and the enhanced image and determining whether each pixel of the input image belongs to the edge portion or the background portion, so as to selectively output the gray level of each pixel of the enhanced or noise-eliminated image.

2 Claims, 14 Drawing Sheets

M1 mask | | | | |

EI

| Pij j / i | 1 | 2 | 3 | 4 | 5 | 6 | 7 | 8 | 9 | 10 | 11 |
|---|---|---|---|---|---|---|---|---|---|---|---|
| 1 | 0 | 0 | 0 | 0 | 0 | 0 | 0 | 0 | 0 | 0 | 0 |
| 2 | 0 | 0 | 0 | 2 | 2 | 2 | 2 | 2 | 0 | 0 | 0 |
| 3 | 0 | 0 | 0 | 2 | 2 | 2 | 2 | 2 | 0 | 0 | 0 |
| 4 | 0 | 0 | 0 | 2 | 2 | 2 | 2 | 2 | 0 | 0 | 0 |
| 5 | 0 | 0 | 0 | 2 | 2 | 2 | 2 | 2 | 0 | 0 | 0 |
| 6 | 0 | 0 | 0 | 2 | 2 | 2 | 2 | 2 | 0 | 0 | 0 |
| 7 | 0 | 0 | 0 | 2 | 2 | 2 | 2 | 2 | 0 | 0 | 0 |
| 8 | 0 | 0 | 0 | 2 | 2 | 2 | 2 | 2 | 0 | 0 | 0 |
| 9 | 0 | 0 | 0 | 2 | 2 | 2 | 2 | 2 | 0 | 0 | 0 |
| 10 | 0 | 0 | 0 | 2 | 2 | 4 | 2 | 2 | 0 | 0 | 0 |
| 11 | 0 | 0 | 0 | 0 | 2 | 2 | 2 | 0 | 0 | 0 | 0 |
| 12 | 0 | 0 | 0 | 0 | 0 | 2 | 0 | 0 | 0 | 0 | 0 |
| 13 | 0 | 0 | 0 | 0 | 0 | 0 | 0 | 0 | 0 | 0 | 0 |

| mask | | | | | |
|---|---|---|---|---|---|

DI

| Pij i\j | 1 | 2 | 3 | 4 | 5 | 6 | 7 | 8 | 9 | 10 | 11 |
|---|---|---|---|---|---|---|---|---|---|---|---|
| 1 | 0 | 0 | 0 | 0 | 0 | 0 | 0 | 0 | 0 | 0 | 0 |
| 2 | 2 | 2 | 2 | 2 | 2 | 2 | 2 | 2 | 2 | 2 | 2 |
| 3 | 8 | 8 | 8 | 8 | 8 | 8 | 8 | 8 | 8 | 8 | 8 |
| 4 | 8 | 8 | 8 | 8 | 8 | 8 | 8 | 8 | 8 | 8 | 8 |
| 5 | 2 | 6 | 6 | 6 | 6 | 6 | 6 | 6 | 6 | 6 | 2 |
| 6 | 6 | 6 | 6 | 6 | 6 | 6 | 6 | 6 | 6 | 6 | 6 |
| 7 | 2 | 6 | 6 | 10 | 10 | 10 | 10 | 10 | 6 | 6 | 2 |
| 8 | 2 | 2 | 10 | 10 | 10 | 10 | 10 | 10 | 10 | 2 | 2 |
| 9 | 2 | 2 | 2 | 2 | 2 | 2 | 2 | 2 | 2 | 2 | 2 |
| 10 | 2 | 4 | 4 | 4 | 4 | 4 | 4 | 4 | 4 | 4 | 2 |
| 11 | 2 | 2 | 4 | 4 | 4 | 4 | 4 | 4 | 4 | 2 | 2 |
| 12 | 0 | 2 | 2 | 2 | 2 | 2 | 2 | 2 | 2 | 2 | 0 |
| 13 | 0 | 0 | 0 | 0 | 0 | 0 | 0 | 0 | 0 | 0 | 0 |

I2

| Pij \ j | 1 | 2 | 3 | 4 | 5 | 6 | 7 | 8 | 9 | 10 | 11 |
|---|---|---|---|---|---|---|---|---|---|---|---|
| 1 | 0 | 0 | 0 | 0 | 0 | 0 | 0 | 0 | 0 | 0 | 0 |
| 2 | 2 | 2 | 2 | 2 | 2 | 2 | 2 | 2 | 2 | 2 | 2 |
| 3 | 5 | 5 | 5 | 5 | 5 | 5 | 5 | 5 | 5 | 5 | 5 |
| 4 | 5 | 5 | 5 | 5 | 5 | 5 | 5 | 5 | 5 | 5 | 5 |
| 5 | 2 | 2 | 2 | 4 | 4 | 4 | 4 | 4 | 2 | 2 | 2 |
| 6 | 4 | 4 | 4 | 4 | 4 | 4 | 4 | 4 | 4 | 4 | 4 |
| 7 | 2 | 2 | 2 | 4 | 4 | 4 | 4 | 4 | 2 | 2 | 2 |
| 8 | 2 | 2 | 2 | 2 | 2 | 2 | 2 | 2 | 2 | 2 | 2 |
| 9 | 2 | 2 | 2 | 2 | 2 | 2 | 2 | 2 | 2 | 2 | 2 |
| 10 | 2 | 2 | 2 | 4 | 4 | 4 | 4 | 4 | 2 | 2 | 2 |
| 11 | 2 | 2 | 2 | 2 | 2 | 2 | 2 | 2 | 2 | 2 | 2 |
| 12 | 0 | 0 | 0 | 2 | 2 | 2 | 2 | 2 | 0 | 0 | 0 |
| 13 | 0 | 0 | 0 | 0 | 0 | 0 | 0 | 0 | 0 | 0 | 0 |

| mask | -1 | 3 | -1 |

I3

| Pij i\j | 1 | 2 | 3 | 4 | 5 | 6 | 7 | 8 | 9 | 10 | 11 |
|---|---|---|---|---|---|---|---|---|---|---|---|
| 1 | 0 | 0 | 0 | 0 | 0 | 0 | 0 | 0 | 0 | 0 | 0 |
| 2 | -2 | 4 | 2 | 2 | 2 | 2 | 2 | 2 | 2 | 4 | -2 |
| 3 | -2 | -2 | 14 | 14 | -4 | 2 | -4 | 14 | 14 | -2 | -2 |
| 4 | -8 | 10 | 8 | 8 | 14 | -10 | 14 | 8 | 8 | 10 | -8 |
| 5 | -2 | 4 | -2 | 14 | -2 | 2 | -2 | 14 | -2 | 4 | -2 |
| 6 | -2 | 0 | 10 | 6 | 10 | -6 | 10 | 6 | 10 | 0 | -2 |
| 7 | -2 | 4 | -2 | 14 | -10 | 10 | -10 | 14 | -2 | 4 | -2 |
| 8 | -2 | 4 | 2 | -6 | 18 | -10 | 18 | -6 | 2 | 4 | -2 |
| 9 | -2 | 4 | 2 | 2 | 2 | 2 | 2 | 2 | 2 | 4 | -2 |
| 10 | -2 | 4 | 0 | 6 | 4 | 4 | 4 | 6 | 0 | 4 | -2 |
| 11 | 0 | -2 | 4 | 0 | 6 | 4 | 6 | 0 | 4 | -2 | 0 |
| 12 | 0 | 0 | -2 | 4 | 2 | 2 | 2 | 4 | -2 | 0 | 0 |
| 13 | 0 | 0 | 0 | 0 | 0 | 0 | 0 | 0 | 0 | 0 | 0 |

FIG. 5

| Pij \ j / i | 1 | 2 | 3 | 4 | 5 | 6 | 7 | 8 | 9 | 10 | 11 |
|---|---|---|---|---|---|---|---|---|---|---|---|
| 1 | 0 | 0 | 0 | 0 | 0 | 0 | 0 | 0 | 0 | 0 | 0 |
| 2 | 2 | 2 | 2 | 0 | 0 | 0 | 0 | 0 | 2 | 2 | 2 |
| 3 | 8 | 8 | 8 | 6 | 6 | 6 | 6 | 6 | 8 | 8 | 8 |
| 4 | 8 | 8 | 8 | 6 | 6 | 6 | 6 | 6 | 8 | 8 | 8 |
| 5 | 2 | 6 | 6 | 4 | 4 | 4 | 4 | 4 | 6 | 6 | 2 |
| 6 | 6 | 6 | 6 | 4 | 4 | 4 | 4 | 4 | 6 | 6 | 6 |
| 7 | 2 | 6 | 6 | 8 | 8 | 8 | 8 | 8 | 6 | 6 | 2 |
| 8 | 2 | 2 | 10 | 8 | 8 | 8 | 8 | 8 | 10 | 2 | 2 |
| 9 | 2 | 2 | 2 | 0 | 0 | 0 | 0 | 0 | 2 | 2 | 2 |
| 10 | 2 | 4 | 4 | 2 | 2 | 0 | 2 | 2 | 4 | 4 | 2 |
| 11 | 2 | 2 | 4 | 4 | 2 | 2 | 2 | 4 | 4 | 2 | 2 |
| 12 | 0 | 2 | 2 | 2 | 2 | 0 | 2 | 2 | 2 | 2 | 0 |
| 13 | 0 | 0 | 0 | 0 | 0 | 0 | 0 | 0 | 0 | 0 | 0 |

IMAGE PROCESSING APPARATUS AND METHOD OF THE SAME

BACKGROUND OF THE INVENTION

1. Field of the Invention

The invention relates to an image processing apparatus and its method and, more particularly, to an image processing apparatus and its method that is capable of effectively eliminating background noise and enhancing the edge signal of an input image. Accordingly, the definition of the input image can be improved.

2. Description of the Prior Art

The key development for flat panel display technology has been focusing on eliminating noise from images. When there is noise on an image, the user will be dissatisfied about the quality of the image. In general, the common noise results from the decoding of VIF signals, the ripples of videos, and the blocking after a JPG/MPEG image is decompressed.

The conventional technology for eliminating noise from images comprises smoothing, mid-filtering, and opening. Furthermore, there are some advanced technologies such as MIC (Morphological Image Cleaning) and OCCO (Open-Close and Close-Open). When the aforesaid prior art is used for eliminating noise from an image, the noise can be effectively eliminated, but the sharpness of the image will decrease at the same time.

Therefore, the scope of the invention is to provide an image processing apparatus and its method for effectively eliminating background noise and enhancing edge signals of an input image, so as to solve the aforesaid problems.

SUMMARY OF THE INVENTION

A scope of the invention is to provide an image processing apparatus and its method for effectively eliminating background noise and enhancing edge signals of an input image.

According to a preferred embodiment, the image processing apparatus of the invention is used for improving the definition of an input image. The input image consists of a plurality of pixels, and the pixels are divided into an edge portion and a background portion.

The image processing apparatus comprises a compound operating unit, a sharpness processing unit, and an edge detecting unit. The compound operating unit is used for generating a noise-eliminated image by subjecting the input image to an open-close process and a close-open process. The sharpness processing unit is used for generating an enhanced image by subjecting the input image to a sharpness process. The edge detecting unit is used for receiving the noise-eliminated image and the enhanced image and for determining whether each pixel of the input image belongs to the edge portion or the background portion. When a pixel belongs to the edge portion, the edge detecting unit outputs the gray level of the pixel of the enhanced image, and when a pixel belongs to the background portion, the edge detecting unit outputs the gray level of the pixel of the noise-eliminated image.

Therefore, according to the invention, the image processing apparatus not only can eliminate the background noise but can also enhance the edge signal of the input image at the same time. Consequently, the definition of the input image is improved.

The advantage and spirit of the invention may be understood by the following recitations together with the appended drawings.

BRIEF DESCRIPTION OF THE APPENDED DRAWINGS

FIG. 3A is a schematic diagram illustrating the eroded image shown in FIG. 1.

FIG. 4C is a schematic diagram illustrating the noise-eliminated image shown in FIG. 1.

FIG. 5 is a schematic diagram illustrating the enhanced image shown in FIG. 1.

FIG. 6A is a schematic diagram illustrating the middle image shown in FIG. 1.

DETAILED DESCRIPTION OF THE INVENTION

Figure 1:
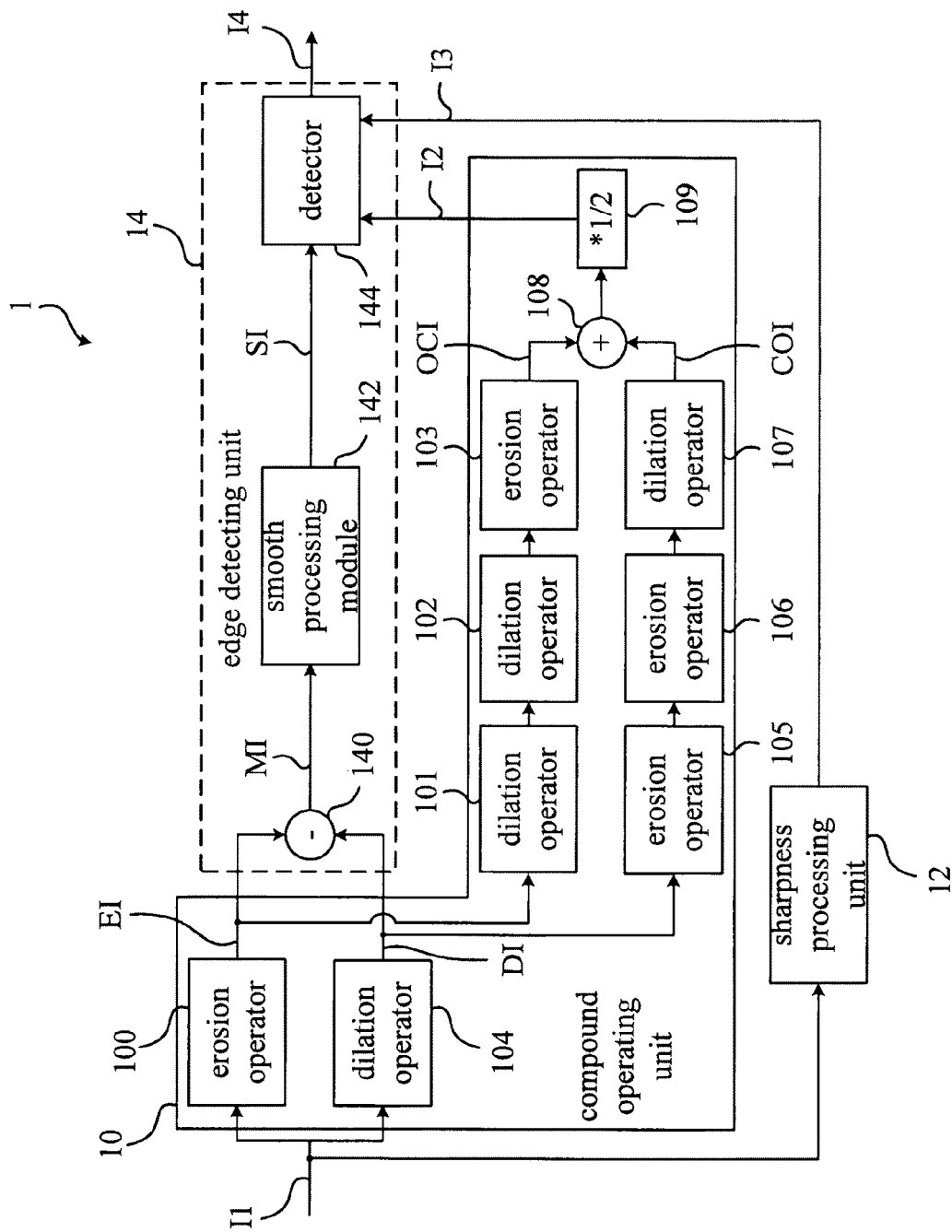
FIG. 1 is a functional block diagram illustrating the image processing apparatus according to a preferred embodiment of the invention.
Figure 2:
FIG. 2 is a schematic diagram illustrating the input image shown in FIG. 1.

Referring to FIG. 1 and FIG. 2, FIG. 1 is a functional block diagram illustrating the image processing apparatus 1 according to a preferred embodiment of the invention, and FIG. 2 is a schematic diagram illustrating the input image I1 shown in FIG. 1. The invention provides an image processing apparatus 1 for improving the definition of an input image I1 in a display system (not shown). In general, the input image I1 consists of a plurality of pixels, and the pixels are divided into an edge portion and a background portion. As shown in FIG. 2, the input image I1 consists of 13*11 pixels, and each pixel has a gray level. As shown in FIG. 1, the image processing apparatus 1 comprises a compound operating unit 10, a sharpness processing unit 12, and an edge detecting unit 14.

As shown in FIG. 1, the compound operating unit 10 is used for generating a noise-eliminated image I2 by subjecting the input image I1 to an open-close process and a close-open process. The open-close process is to sequentially subject the input image I1 to the erosion operator 100, the dilation operator 101, the dilation operator 102, and the erosion operator 103 for processing. The close-open process is to sequentially subject the input image I1 to the dilation operator 104, the erosion operator 105, the erosion operator 106, and the dilation operator 107 for processing.

Figure 3B:
FIG. 3B is a schematic diagram illustrating the dilated image shown in FIG. 1.
Figure 3B:

Referring to FIG. 3, FIG. 3A is a schematic diagram illustrating the eroded image EI shown in FIG. 1, and FIG. 3B is a schematic diagram illustrating the dilated image DI shown in FIG. 1. For example, the eroded image EI will be generated after the erosion operator 100 of the compound operating unit 10 utilizes a 1-D mask M1 to process the input image I1, as shown in FIG. 3A; the dilated image DI will be generated after the dilation operator 104 of the compound operating unit 10 utilizes a 1-D mask M2 to process the input image I1, as shown in FIG. 3B. It should be noted that the invention can also utilize a 2-D mask to process the input image I1 during the open-close process or the close-open process, but the 1-D mask is preferable to save hardware resources.

Figure 4A:
FIG. 4A is a schematic diagram illustrating the open-close image shown in FIG. 1.
Figure 4B:
FIG. 4B is a schematic diagram illustrating the close-open image shown in FIG. 1.

Referring to FIG. 1 and FIG. 4, FIG. 4A is a schematic diagram illustrating the open-close image OCI shown in FIG. 1; FIG. 4B is a schematic diagram illustrating the close-open image COI shown in FIG. 1, and FIG. 4C is a schematic diagram illustrating the noise-eliminated image I2 shown in FIG. 1. In this embodiment, the eroded image EI is sequentially processed by the dilation operator 101, the dilation operator 102, and the erosion operator 103, so as to generate the open-close image OCI (as shown in FIG. 4A). The dilated image DI is then sequentially processed by the erosion operator 105, the erosion operator 106, and the dilation operator 107 to generate the close-open image COI (as shown in FIG. 4B). Afterward, the open-close image OCI and the close-open image COI are summed up by the adder 108 and then averaged by the multiplicator 109 to generate the noise-eliminated image I2 (as shown in FIG. 4C). The aforesaid open-close process and close-open process can be easily achieved by one skilled in the art, so the related description will not be mentioned here.

Referring to FIG. 1 and FIG. 5, FIG. 5 is a schematic diagram illustrating the enhanced image I3 shown in FIG. 1. The sharpness processing unit 12 is used for generating an enhanced image I3 by subjecting the input image I1 to a sharpness process. In this embodiment, the sharpness processing unit 12 utilizes a mask M3 (as shown in FIG. 5) to process the input image I1 to generate the enhanced image I3. It should be noted that, the prior art utilizes the following mask of formula 1 to sharpen the input image I1.

$$\frac{1}{1+K} * [-2 \quad 5+K \quad -2].$$ Formula 1

In formula 1, K represents the grade of definition of the image prior to the input image. For example, the definition can be classified in 15 grades (i.e. $1 \leq K \leq 15$), and if the grade of the definition of the image prior to the input image is sixth grade (K=6), the mask for the input image will be set as [−2 11 −2]/7. However, since the invention can determine the edge portion and the background portion of the input image, the invention can utilize the most powerful mask M3 shown in FIG. 5 (i.e. assume K=1) to sharpen the input image, so as to improve the definition of the edge portion.

Figure 6B:
FIG. 6B is a schematic diagram illustrating the smooth image shown in FIG. 1.
Figure 6B:

Referring to FIG. 1 and FIG. 6, FIG. 6A is a schematic diagram illustrating the middle image MI shown in FIG. 1, and FIG. 6B is a schematic diagram illustrating the smooth image SI shown in FIG. 1. As shown in FIG. 1, the edge detecting unit 14 comprises a subtractor 140, a smooth processing module 142, and a detector 144. The subtractor 140 is used for generating a middle image MI (as shown in FIG. 6A) by subtracting the eroded image EI from the dilated image DI. The smooth processing unit 142 is used for generating a smooth image SI (as shown in FIG. 6B) by subjecting the middle image MI to a smooth process using a mask M4. The mask M4 is set as [1 2 1]/4 for smoothing each pixel of the middle image MI. For example, $P_{34}$ is equal to 6 before the smooth process, and $P_{34}$ is equal to 7, i.e. (8*1+6*2+6*1)/4, after the smooth process, and so on. In another preferred embodiment, the mask M4 can be also set as [1 2 2 2 1]/8 for smoothing each pixel.

Afterward, the detector 144 compares the gray level of each pixel of the smooth image SI with a threshold. When the gray level of one pixel is larger than the threshold, the detector 144 determines that the pixel belongs to the edge portion, and when the gray level of one pixel is smaller than or equal to the threshold, the detector 144 determines that the pixel belongs to the background portion. The threshold can be set by the designer based on practical application. When one pixel belongs to the edge portion, the edge detecting unit 14 will output the gray level of the pixel of the enhanced image I3, and when one pixel belongs to the background portion, the edge detecting unit 14 will output the gray level of the pixel of the noise-eliminated image I2.

Figure 7:
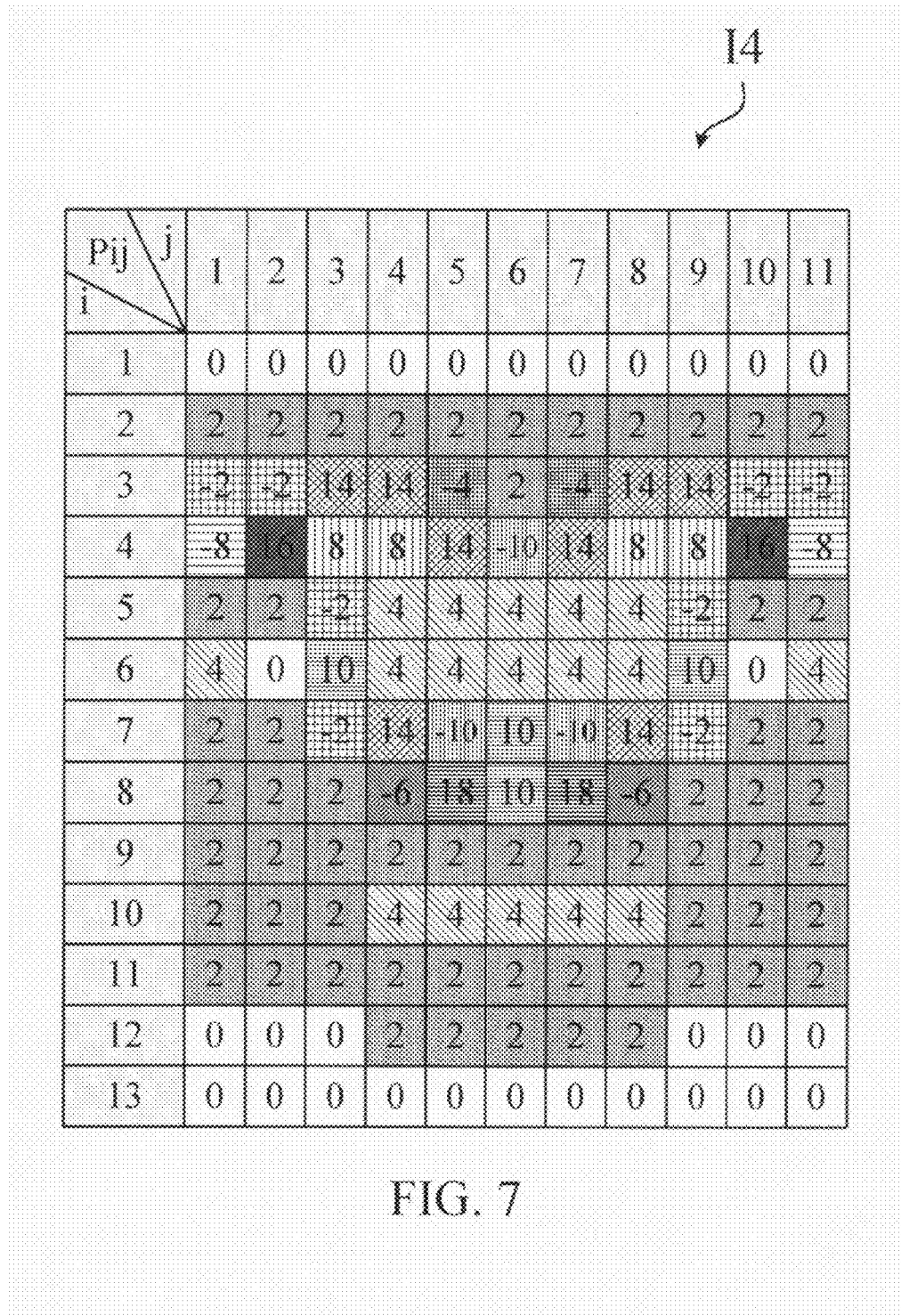
FIG. 7 is a schematic diagram illustrating the output image shown in FIG. 1.

Referring to FIG. 7, FIG. 7 is a schematic diagram illustrating the output image I4 shown in FIG. 1. For example, if the threshold is set as 5, the edge detecting unit 14 will output the image I4 shown in FIG. 7.

Figure 8A:
FIG. 8A illustrates the input image before being adjusted by the invention.
Figure 8B:
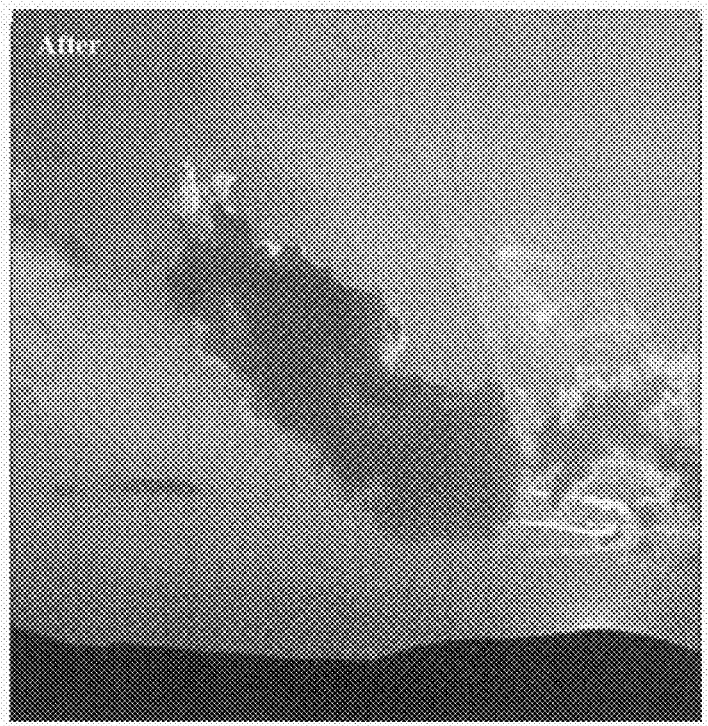
FIG. 8B illustrates the input image after being adjusted by the invention.

Referring to FIG. 8, FIG. 8A illustrates the input image before being adjusted by the invention, and FIG. 8B illustrates the input image after being adjusted by the invention. Obviously, the definition of the image shown in FIG. 8B is better than that shown in FIG. 8A.

Figure 9:
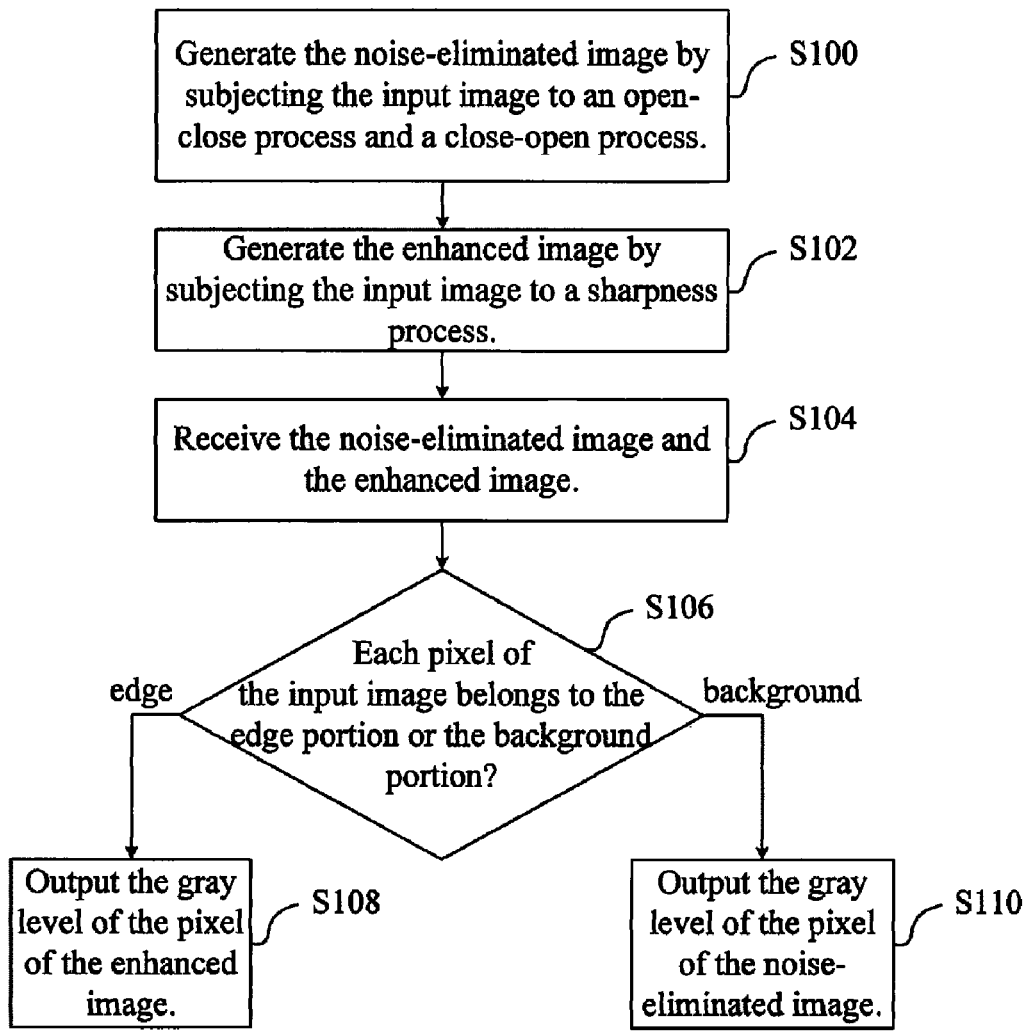
FIG. 9 is a flowchart showing the image processing method according to a preferred embodiment of the invention.

Referring to FIG. 9 along with FIG. 2 through FIG. 7, FIG. 9 is a flowchart showing the image processing method according to a preferred embodiment of the invention. The image processing method of the invention is used for improving the definition of the input image I1 in a display system (not shown). According to the aforesaid preferred embodiment, the image processing method of the invention comprises the following steps.

In the beginning, step S100 is performed to generate the noise-eliminated image I2 by subjecting the input image I1 to an open-close process and a close-open process. Afterward, step S102 is performed to generate the enhanced image I3 by subjecting the input image I1 to a sharpness process. Step S104 is then performed to receive the noise-eliminated image I2 and the enhanced image I3. Step S106 is then performed to determine whether each pixel of the input image I1 belongs to the edge portion or the background portion. If the pixel belongs to the edge portion, step S108 is then performed to output the gray level of the pixel of the enhanced image I3, or if the pixel belongs to the background portion, step S110 is then performed to output the gray level of the pixel of the noise-eliminated image I2.

In the aforesaid step S100, the input image I1 is converted to an eroded image EI by the erosion process, and the input image I1 is also converted to a dilated image DI by the dilation process.

Figure 10:
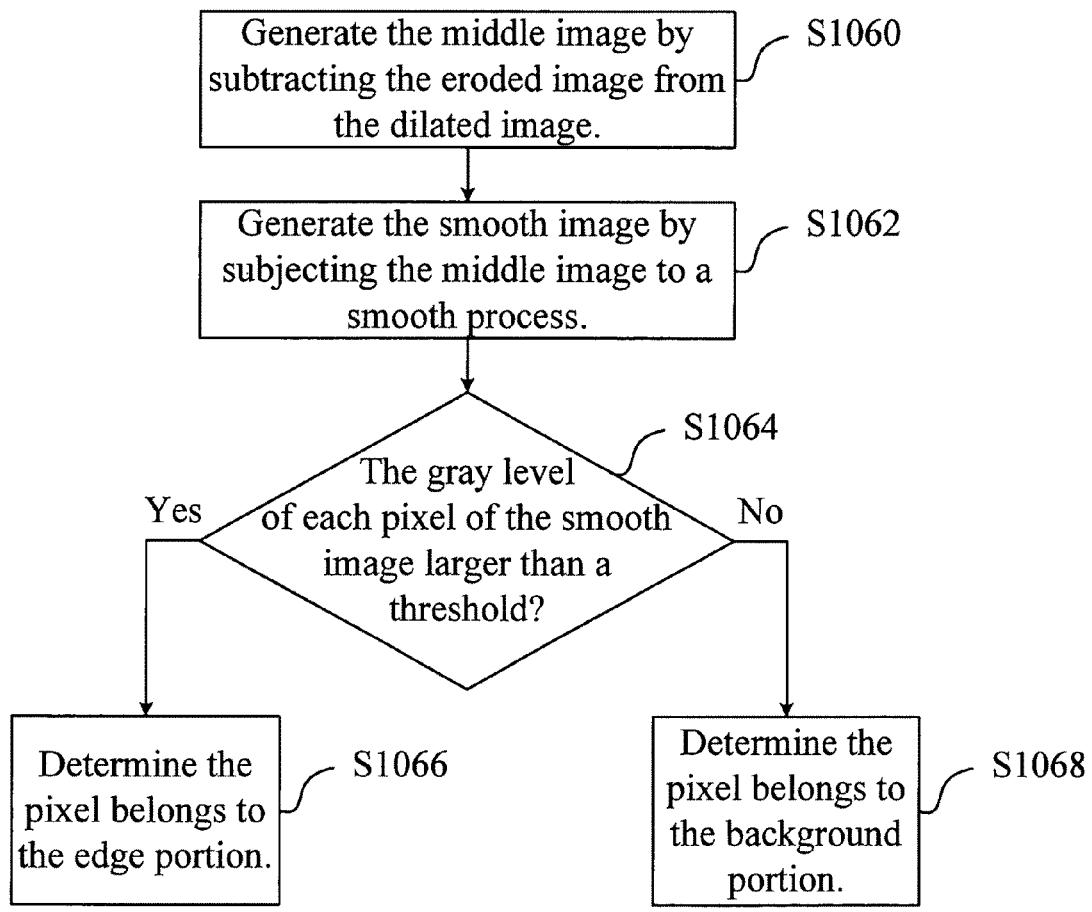
FIG. 10 is a flowchart showing the step S106 shown in FIG. 9 in detail.

Referring to FIG. 10, FIG. 10 is a flowchart showing step S106 shown in FIG. 9 in detail. The step S106 comprises the following steps. S1060 is performed to generate the middle image MI by subtracting the eroded image EI from the dilated image DI. Afterward, step S1062 is performed to generate the smooth image SI by subjecting the middle image MI to a smooth process. Step S1064 is then performed to compare the gray level of each pixel of the smooth image SI with a threshold. If the gray level of the pixel is larger than the threshold, step S1066 is performed to determine that the pixel belongs to the edge portion, or if the gray level of the pixel is smaller than or equal to the threshold, step S1068 is performed to determine that the pixel belongs to the background portion.

Compared to the prior art, according to the invention, the image processing apparatus and its method not only can eliminate the background noise but can also enhance the edge signal of the input image at the same time. Consequently, the definition of the input image is improved.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An image processing method for improving the definition of an input image, the input image consisting of a plurality of pixels, the pixels being divides into an edge portion and a background portion, the method comprising steps of:
    (a) generating a noise-eliminated image by subjecting the input image to an open-close and a close-open process;
    (b) generating an enhanced image by subjecting the input image to a sharpness process;
    (c) receiving the noise-eliminated image and the enhanced image and determining that each pixel of the input image belongs to the edge portion or the background portion, if one pixel belongs to the edge portion, performing step (d), if one pixel belongs to the background portion, performing step (e);
    (d) outputting the gray level of the pixel of the enhanced image; and
    (e) outputting the gray level of the pixel of the noise-eliminated image,
    wherein the step(c) comprises steps of:
    (c1) generating a middle image by subtracting the eroded image from the dilated image;
    (c2) generating a smooth image by subjecting the middle image to a smooth process;
    (c3) comparing the gray level of each of the smooth image with a threshold, if the gray level of one pixel is larger than the threshold, performing step (c4), if the gray level of one pixel is smaller than or equal to the threshold, performing step (c5);
    (c4) determining the pixel belongs to the edge portion; and
    (c5) determining the pixel belongs to the background portion.

2. The method of claim 1, wherein the step (a) comprises step of:
    (a1) generating an eroded image by subjecting the input image to an erosion process; and
    (a2) generating a dilated image by subjecting the input image to a dilation process.

* * * * *